US012414510B2

(12) United States Patent
Xie et al.

(10) Patent No.: US 12,414,510 B2
(45) Date of Patent: Sep. 16, 2025

(54) GARDEN BLOWER (71) Applicant: Zhejiang Sunseeker Industrial Co., Ltd., Jinhua (CN)

(72) Inventors: Zuojie Xie, Jinhua (CN); Guomin Liu, Jinhua (CN); Qing Zhang, Jinhua (CN); Jiaxuan Wu, Jinhua (CN); Jiangjie Guo, Jinhua (CN); Wenbin Liu, Jinhua (CN); Jie Zhang, Jinhua (CN); Peng Li, Jinhua (CN)

(73) Assignee: Zhejiang Sunseeker Industrial Co., Ltd., Jinhua (CN)

( * ) Notice: Subject to any disclaimer, the term of this patent is extended or adjusted under 35 U.S.C. 154(b) by 0 days.

(21) Appl. No.: 18/955,934

(22) Filed: Nov. 21, 2024

(65) Prior Publication Data

US 2025/0081902 A1  Mar. 13, 2025

(30) Foreign Application Priority Data

Mar. 21, 2024  (CN) .................. 202410323062.X (51) Int. Cl.
*A01G 20/47* (2018.01)
*B25F 5/00* (2006.01)

(52) U.S. Cl.
CPC .............. *A01G 20/47* (2018.02); *B25F 5/006* (2013.01)

(58) Field of Classification Search
CPC ................................ A01G 20/47; B25F 5/006
See application file for complete search history.

(56) References Cited

U.S. PATENT DOCUMENTS 10,337,526 B2 *  7/2019  Shao .................. F04D 29/703
11,778,960 B2 * 10/2023  Olvera ................ A47L 9/2842
                                                         15/405

(Continued)

FOREIGN PATENT DOCUMENTS

CA      2929011 C  *  9/2019  ............... A45F 3/14
CN  209025863 U  *  6/2019

(Continued)

OTHER PUBLICATIONS

CN-218717600-U—English Machine Translation (Year: 2023).*

(Continued)

*Primary Examiner* — Marc Carlson
(74) *Attorney, Agent, or Firm* — Addison D. Ault; IPGentleman Intellectual Property Services, LLC (57) ABSTRACT The present disclosure provides a garden blower, including a housing and a duct assembly, the duct assembly includes an outer duct, a motor fan blade assembly and a guide cone; the outer duct and the rear casing are arranged in such a way that there is an annular interval therebetween, and a plurality of first anti-vibration components are arranged between the outer duct and the holding casing; the first anti-vibration components are close to the motor fan blade assembly, and form a first anti-vibration plane perpendicular to the motor axis of the motor fan blade assembly. This technical solution can suppress the transmission of vibration generated by the rotation of the motor fan blade assembly to other components, especially the holding casing, and effectively avoids the mutual influence between the vibration of the motor fan blade assembly and the disturbance of the rear casing caused by the airflow.

8 Claims, 11 Drawing Sheets (56) References Cited

U.S. PATENT DOCUMENTS

| | | | | |
|---|---|---|---|---|
| 11,889,794 B2* | 2/2024 | Cholst | ............... | F04D 19/002 |
| 2016/0059402 A1* | 3/2016 | Notaras | ............... | B25F 5/006 |
| | | | | 16/444 |
| 2016/0330913 A1* | 11/2016 | Shao | ............... | F04D 29/545 |
| 2017/0325410 A1* | 11/2017 | Gao | ............... | A01G 20/47 |
| 2022/0201946 A1* | 6/2022 | Cholst | ............... | F04D 29/545 |
| 2022/0362919 A1* | 11/2022 | Kolb | ............... | B25F 5/02 |
| 2023/0296102 A1* | 9/2023 | Herrera | ............... | F04D 25/0673 |
| | | | | 417/411 |

FOREIGN PATENT DOCUMENTS

| | | | | | |
|---|---|---|---|---|---|
| CN | 111749174 | A | * | 10/2020 | ............ A01G 20/47 |
| CN | 111749914 | A | * | 10/2020 | |
| CN | 213203946 | U | * | 5/2021 | |
| CN | 115075176 | A | * | 9/2022 | |
| CN | 218717600 | U | * | 3/2023 | |
| CN | 117846989 | A | * | 4/2024 | ........... A47L 9/0081 |
| JP | 2021521374 | A | * | 8/2021 | |
| WO | WO-2022044991 | A1 | * | 3/2022 | ............ A01G 20/47 |

OTHER PUBLICATIONS

CN 213203946 U—English Machine Translation (Year: 2021).*
CN 209025863 U—English Machine Translation (Year: 2019).*
CNIPA; CN202410323062.X first Office Action dated May 9, 2024, Original Chinese, pp. 1-8.
CNIPA; CN202410323062.X first Office Action dated May 9, 2024, English Machine translation generated Nov. 21, 2024, pp. 1-7.

\* cited by examiner

GARDEN BLOWER

CROSS-REFERENCE TO RELATED APPLICATION

This application claims priority to Chinese Patent Application No. 202410323062.X, filed on Mar. 21, 2024 before the China National Intellectual Property Administration, the disclosure of which is incorporated herein by reference in entirety.

TECHNICAL FIELD

The present disclosure relates to a garden blower, belonging to the field of garden tools.

BACKGROUND

The blower is a commonly used garden electric tool, mainly used to clean fallen leaves, grass clippings, road dust, etc. by airflow. Generally speaking, there is a gap between the outlet position of the duct and the housing of the existing blower. The airflow from the duct to the air outlet will flow out from the gap, resulting in poor sealing of the blower. In the prior art, in order to solve this problem, the duct is hard-connected to the housing at the outlet position. However, it will increase the vibration of the blower, causing noise and discomfort.

At present, there is provided a Chinese invention patent application with application number CN202110276471.5, titled with blower, it sets a noise reduction seal between the housing and the duct to solve the above problem. However, the noise reduction and vibration reduction effect of the structure still has a lot of room for improvement, and when using the blower, you will still feel a lot of vibration and noise.

SUMMARY

The present disclosure aims to provide a garden blower that can effectively prevent vibration.

In view of this, the present disclosure provides a garden blower, comprising:
  a housing having an air inlet end and an air outlet end; and
  a duct assembly disposed in the housing and located between the air inlet end and the air outlet end,
  wherein the duct assembly comprises an outer duct, a motor fan blade assembly and a guide cone, and the motor fan blade assembly and the guide cone are disposed in the outer duct;
  wherein the outer duct and a rear casing of the housing are arranged in such a way that there is an annular interval therebetween, and the outer duct and the rear casing are deliberately set at a safe distance from each other so as to maintain an absolute non-contact state, forming a negative pressure inlet;
  wherein a first anti-vibration component is provided between the outer duct and a holding casing of the housing, so that the outer duct and the holding casing are spaced apart by the first anti-vibration component to maintain a state of non-direct contact;
  wherein the first anti-vibration component is close to the motor fan blade assembly and forms a first anti-vibration plane perpendicular to a motor axis of the motor fan blade assembly; the first anti-vibration plane is parallel to a direction of an exciting force of the vibration generated by the motor fan blade assembly, and passes through the motor fan blade assembly and/or a holding handle located above the motor fan blade assembly.

According to some embodiments of the present disclosure, a second anti-vibration component is provided between one end of the outer duct away from the motor fan blade assembly and the holding casing, so that the outer duct and the holding casing are spaced apart by the second anti-vibration component to maintain a state of non-direct contact;
  wherein the second anti-vibration component forms a second anti-vibration plane parallel to the first anti-vibration plane, and the guide cone is at least partially located between the first anti-vibration plane and the second anti-vibration plane.

According to some embodiments of the present disclosure, the outer duct comprises a support end located at the air outlet, the support end is configured to support a cone end of the guide cone, the other end of the guide cone is connected to a motor seat, and the second anti-vibration component is sandwiched between an outer wall of the support end and an inner wall of the holding casing.

According to some embodiments of the present disclosure, the second anti-vibration component is close to the guide cone, and the second anti-vibration plane formed by the second anti-vibration component passes through the guide cone and is perpendicular to an extension direction of an axis of the guide cone.

According to some embodiments of the present disclosure, a center of gravity of the motor fan blade assembly is located between the first anti-vibration plane and the second anti-vibration plane.

According to some embodiments of the present disclosure, a distance $L2$ from the second anti-vibration plane to the center of gravity is greater than a distance $L1$ from the first anti-vibration plane to the center of gravity.

According to some embodiments of the present disclosure, under the rotation of the motor fan blade assembly, an airflow flows at high speed from the air inlet end to the air outlet end, and an accommodating chamber connected to the negative pressure inlet is provided between the rear casing and the holding casing, and a controller is provided in the accommodating chamber.

According to some embodiments of the present disclosure, the rear casing is provided with an installation port, the controller is embedded in the installation port for positioning, heat dissipation fins of the controller are exposed to the installation port, and the airflow flowing at high speed from the air inlet end to the air outlet end is suitable for passing over the heat dissipation fins of the controller.

According to some embodiments of the present disclosure, the outer duct comprises a motor fan blade bracket and a connecting pipe connected to each other, the motor fan blade bracket is provided with a cable hole for allowing a power line connecting the controller to a motor to pass through, and an outer wall of the motor fan blade bracket is formed with multiple reinforcing ring ribs, and the multiple reinforcing ring ribs cover a non-connected part of the motor fan blade bracket and the connecting pipe.

Compared with the prior art, the garden blower provided by the present disclosure has the following beneficial technical effects:

When the garden blower is in operation, the vibration source mainly comes from the vibration generated by the rotation of the motor fan blade assembly and the disturbance of the airflow to the housing due to turbulence. By arranging multiple first anti-vibration components between the outer duct and the holding casing, the vibration generated by the rotation of the motor fan blade assembly can be suppressed from being transmitted to other components, especially the holding casing. At the same time, the annular interval between the outer duct and the rear casing can effectively avoid the mutual influence between the rotation vibration of the motor fan blade assembly and the disturbance of the rear casing due to the airflow. At this time, whether it is the rotation vibration of the motor fan blade assembly or the disturbance of the rear casing due to the airflow, the two will not contact each other, and thereby no vibration superposition will be generated.

According to another aspect of the present disclosure, there is provided another garden blower, comprising:

a housing having an air inlet end and an air outlet end; and a main air path component, comprising a duct assembly, and forming a main air path suitable for airflow to flow from the air inlet end to the air outlet end at high speed, an accommodating chamber being formed between the main air path component and the housing, and an electronic device being provided in the accommodating chamber, wherein the duct assembly comprises an outer duct and a motor fan blade assembly arranged in the outer duct;

wherein the outer duct and a rear casing of the housing are arranged in such a way that there is an annular interval therebetween, and a negative pressure inlet connected to the accommodating chamber is formed between the outer duct and the rear casing; during operation of the garden blower, the heat emitted by the electronic device flows from the accommodating chamber into the main air path through the negative pressure inlet;

wherein a first anti-vibration component is provided between the outer duct and a holding casing of the housing, so that the outer duct and the holding casing are spaced apart by the first anti-vibration component, and during operation of the garden blower, the outer duct and the holding casing are not in direct contact;

wherein the first anti-vibration component is close to the motor fan blade assembly and forms a first anti-vibration plane perpendicular to a motor axis of the motor fan blade assembly; the first anti-vibration plane is parallel to a direction of an exciting force of the vibration generated by the motor fan blade assembly.

According to some embodiments of the present disclosure, the electronic device comprises a controller.

According to some embodiments of the present disclosure, the rear casing constitutes a part of the main air path component.

This garden blower has the above-mentioned beneficial technical effects, same to the above garden blower, which will not be described repeatedly here. In addition, the heat generated by the electronic device in the accommodating chamber can be introduced into the main air path through the formed negative pressure inlet, so as to effectively dissipate the heat of the electronic device.

BRIEF DESCRIPTION OF THE DRAWINGS

In order to more clearly illustrate the specific implementation of the present disclosure or the technical solution in the prior art, the drawings required for the description of the specific implementation or prior art will be briefly introduced below. Obviously, the drawings in the following description are only some implementations of the present disclosure. For ordinary technicians in this field, other drawings may also be obtained based on these drawings without creative work.

Garden blower 100; housing 10; air inlet end 101; air outlet end 102; rear casing 10a; holding casing 10b; holding handle 10b1; duct assembly 20; outer duct 201; motor fan blade assembly 202; guide cone 203; first anti-vibration component 30; first anti-vibration plane S1; second anti-vibration component 40; second anti-vibration plane S2; support end 60; center of gravity G; accommodating chamber 70; controller 80; installation port 10a1; motor fan blade bracket 201a; connecting pipe 201b; first connecting part 201a1; second connecting part 201b1; cable hole S; non-connected part 201a2; main air path component 200; main air path 300; motor axis L.

DETAILED DESCRIPTION OF EMBODIMENTS

The technical solution of the present disclosure will be clearly and completely described below in conjunction with the accompanying drawings. Obviously, the described embodiments are part of the present disclosure, but not all of them. Based on the embodiments of the present disclosure, all other embodiments obtained by ordinary technicians in this field without creative work fall within the scope of protection of the present disclosure.

First Embodiment

Figure 1:
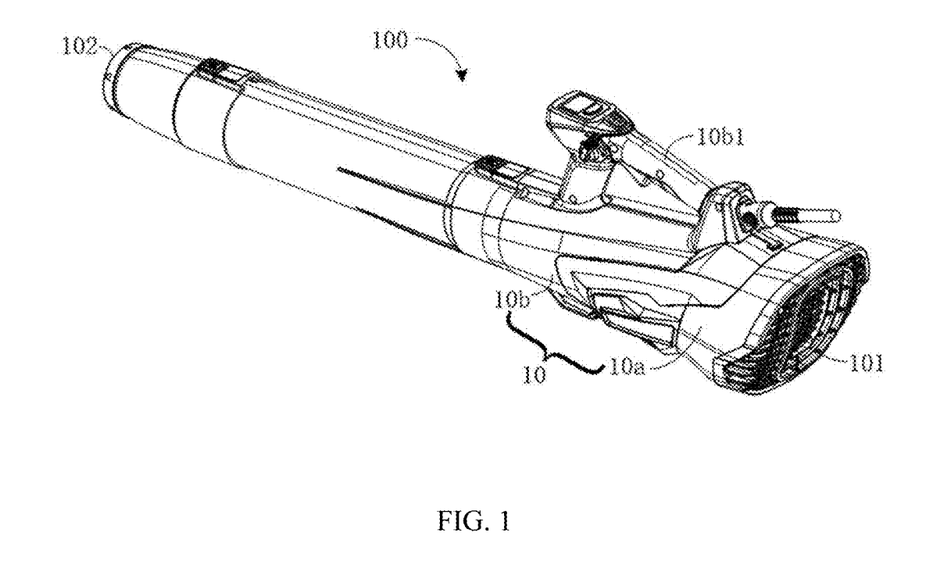
FIG. 1 is a schematic structural view of the first specific embodiment of the present disclosure.
Figure 2:
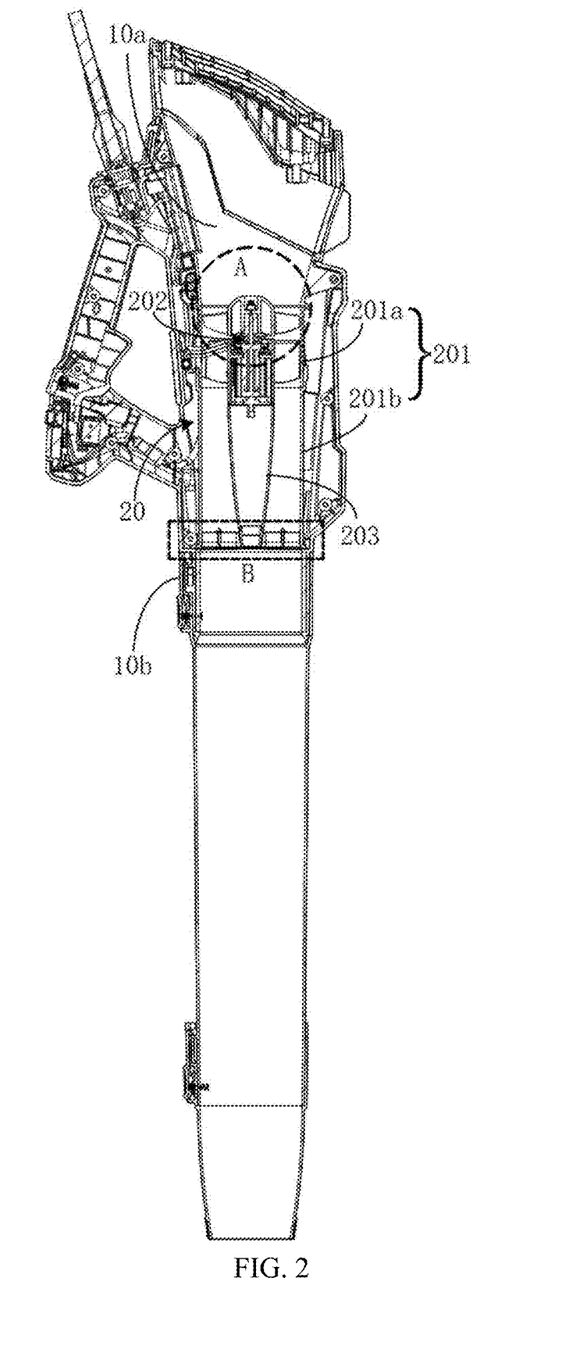
FIG. 2 is a structural cross-sectional view of the first specific embodiment of the present disclosure.

As shown in FIGS. 1 and 2, a garden blower 100 includes a housing 10 and a duct assembly 20.

The housing 10 has an air inlet end 101 and an air outlet end 102, wherein the housing 10 is composed of at least a rear casing 10a and a holding casing 10b, the rear end of the rear casing 10a forms the air inlet end 101, and the holding casing 10b has a holding handle 10b1 for the user to hold and use.

The duct assembly 20 is arranged in the housing 10, and the duct assembly 20 is located between the air inlet end 101 and the air outlet end 102.

The duct assembly 20 comprises an outer duct 201, a motor fan blade assembly 202 and a guide cone 203, the motor fan blade assembly 202 and the guide cone 203 are arranged in the outer duct 201; the user holds the holding handle 10b1 and actuates the trigger switch, the garden blower 100 receives power and starts to work, the fan blades of the motor fan blade assembly 202 start to rotate under the drive of the motor, and under the rotation of the motor fan blade assembly 202, the airflow flows from the air inlet end 101 through the outer duct 201 and flows to the air outlet end 102 at a high speed.

Figure 3:
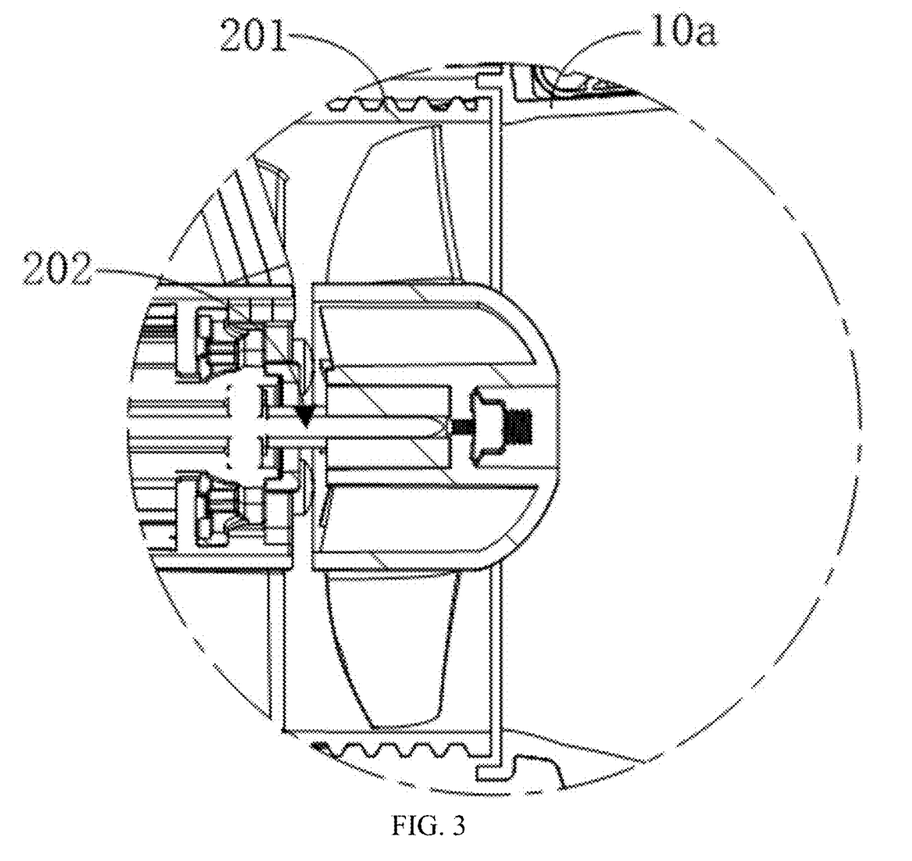
FIG. 3 is a partial enlarged schematic view of portion A of the present disclosure in FIG. 2.
Figure 5:
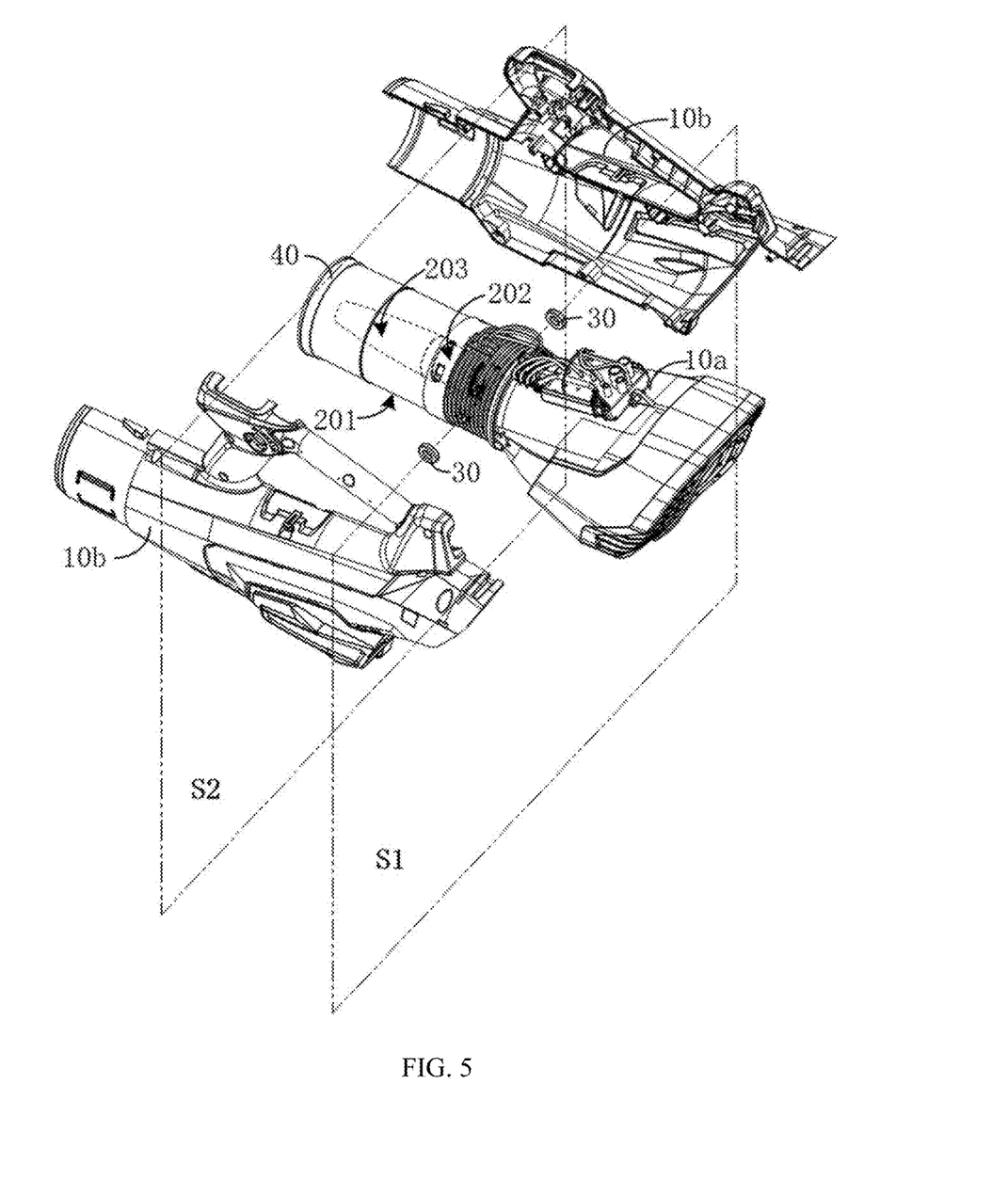
FIG. 5 is a schematic explosive view of the possible embodiment 1 of the present disclosure showing the second anti-vibration plane S2.

Further, referring to the partial enlarged view shown in FIG. 3 and FIG. 5, the outer duct 201 and the rear casing 10a of the housing 10 are arranged with an annular spacing/interval. Preferably, the annular spacing/interval is 1 mm-2 mm, and more preferably, the annular spacing/interval is set to 1.5 mm. For example, the annular diameter of the rear casing 10a is 99.4 mm, and the annular diameter of the corresponding part of the outer duct 201 is 96.4 mm. Thus, the annular spacing/interval between the two is just 1.5 mm. In this way, the outer duct 201 and the rear casing 10a are deliberately set outside the safe distance of non-contact, maintaining an absolute non-contact state.

This setting can effectively avoid the mutual influence between the vibration of the motor fan blade assembly 202 and the disturbance caused by the airflow of the rear casing 10a. When the garden blower 100 is in operation, the vibration source mainly comes from the vibration generated by the rotation of the motor fan blade assembly 202 and the disturbance of the airflow to the housing 10 due to turbulence. When the annular interval between the outer duct 201 and the rear casing 10a of the housing 10 maintains an absolute non-contact state, whether it is the rotation vibration of the motor fan blade assembly 202 or the disturbance of the rear casing 10a due to the airflow, the two will not touch each other. The two are independent of each other and are not affected by each other, and no vibration superposition will be generated.

At the same time, a first anti-vibration component 30 is provided between the outer duct 201 and the holding casing 10b of the housing 10; the first anti-vibration component 30 allows the outer duct 201 and the holding casing 10b to be spaced apart by the anti-vibration component to maintain a non-direct contact state. The first anti-vibration component 30 is preferably made of elastic material, such as rubber, sponge, etc. Thus, the outer duct 201 and the holding casing 10b are in indirect contact with each other through the anti-vibration component. Through the elastic deformation of the first anti-vibration component 30, the vibration of the outer duct 201 generated by the rotation of the motor can be suppressed from being transmitted to the holding casing 10b. Herein, the first anti-vibration components 30 are preferably multiple, and the multiple first anti-vibration components 30 are arranged annularly. Of course, the first anti-vibration component 30 may be one. If so, the first anti-vibration component 30 is an elastic component that is annular as a whole.

Specifically, when the first anti-vibration components 30 are preferably multiple, the outer duct 201 is provided with protrusions protruding toward the holding casing 10b, the first anti-vibration components 30 are installed on the protrusions, and the holding casing 10b is correspondingly provided with receiving portions, so that the first anti-vibration components 30 are clamped between the outer duct 201 and the holding casing 10b, specifically, between the protrusions of the outer duct 201 and the receiving portions of the holding casing 10b.

Figure 6:
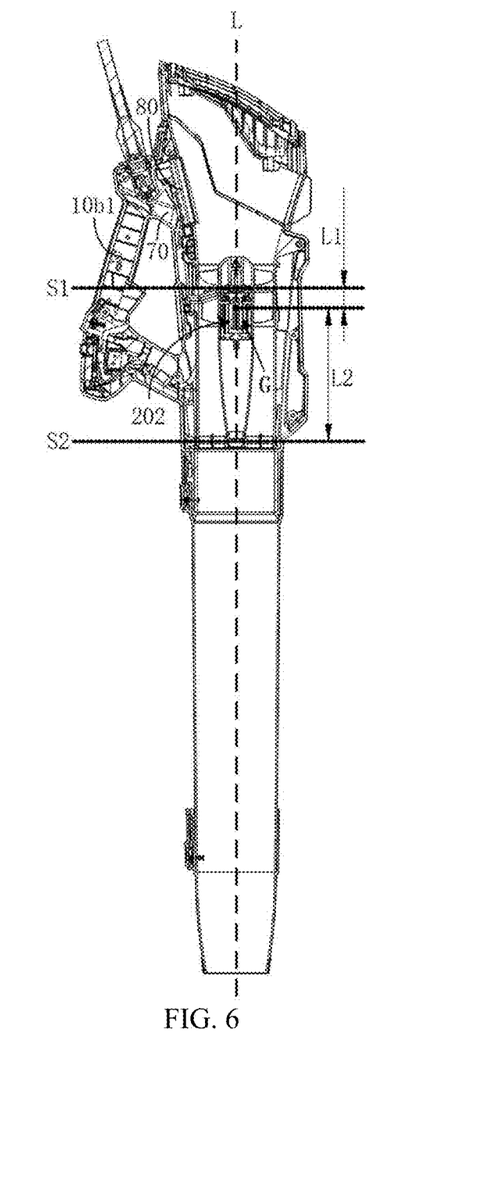
FIG. 6 is a schematic view showing anti-vibration plane relationship of the possible embodiment 1 of the present disclosure.

Referring to FIGS. 5 and 6, the first anti-vibration components 30 are close to the motor fan blade assembly 202 and form a first anti-vibration plane S1 which is perpendicular to the motor axis L of the motor fan blade assembly 202. The first anti-vibration plane S1 is parallel to the direction of the exciting force of the vibration generated by the motor fan blade assembly 202 and passes through the motor fan blade assembly 202. At this time, the first anti-vibration plane S1 is close to the center of the vibration source (motor fan blade assembly 202), which can largely offset the exciting force of the vibration generated by the motor fan blade assembly 202, and can more effectively suppress the vibration generated by the motor fan blade assembly 202.

Alternatively, the first anti-vibration plane S1 passes through the holding handle 10b1 located above the motor fan blade assembly 202. Since it is well known that there is a holding/gripping space suitable for fingers to be inserted below the holding/gripping handle 10b1, that is, the part of the holding handle 10b1 for users to grip is separated and spaced from the holding casing 10b below it, which can play a role in reducing vibration transmission. When the first anti-vibration plane S1 passes through the holding handle 10b1, the holding handle 10b1, as the part of the user holding the housing, has a small vibration feeling.

Or further, it passes through the motor fan blade assembly 202 and the holding handle 10b1 located above the motor fan blade assembly 202 at the same time. Thus, on the one hand, the first anti-vibration plane S1 is close to the center of the vibration source (motor fan blade assembly 202), which can largely offset the exciting force of the vibration generated by the motor fan blade assembly 202, and can more effectively suppress the vibration generated by the motor fan blade assembly 202, on the other hand, the vibration transmission from the holding casing 10b to the holding portion of the holding handle 10b1 is weakened through the holding space below the holding handle 10b1.

Figure 7:
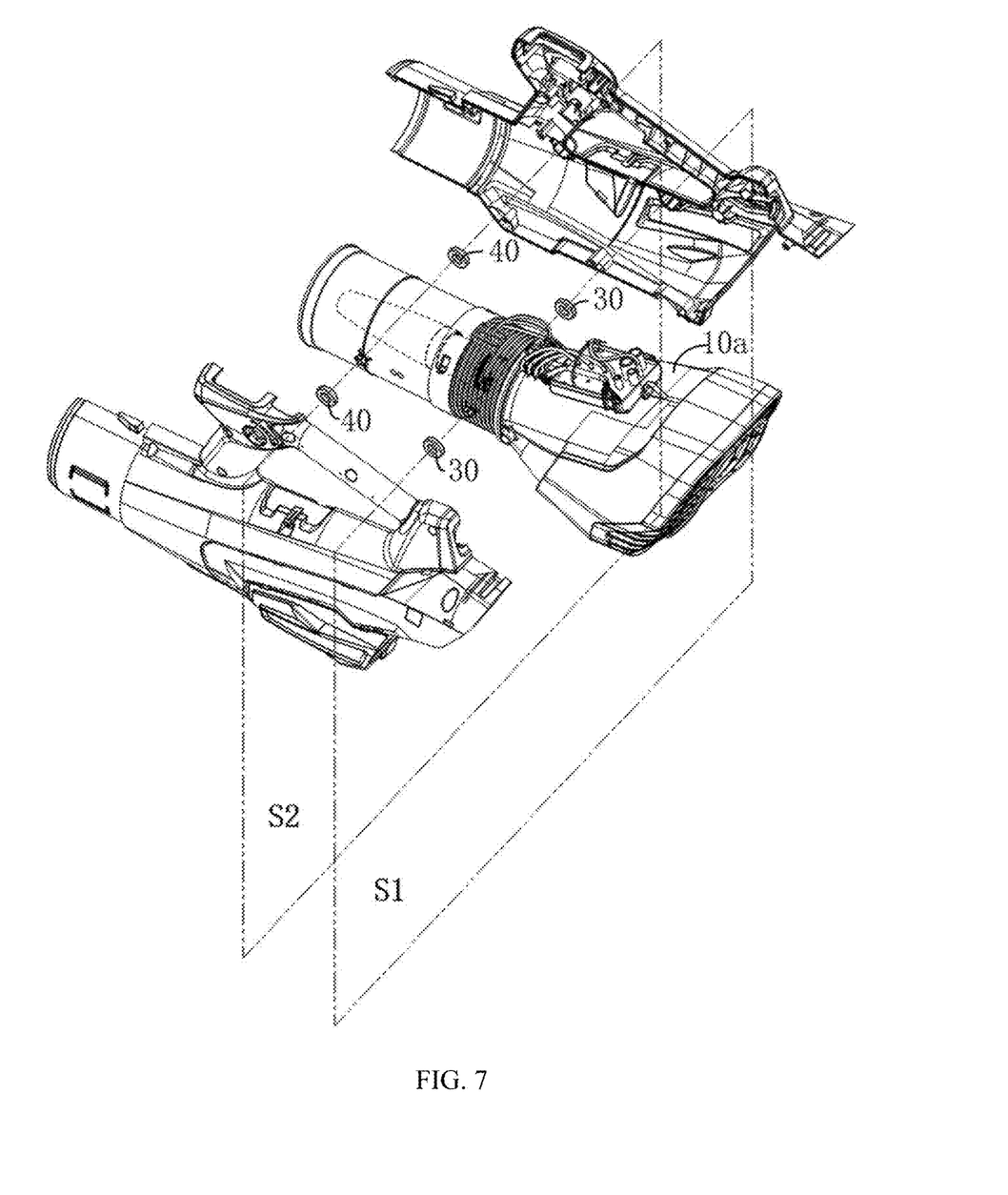
FIG. 7 is a schematic explosive view of the possible embodiment 2 of the present disclosure showing the second anti-vibration plane S2.
Figure 8:
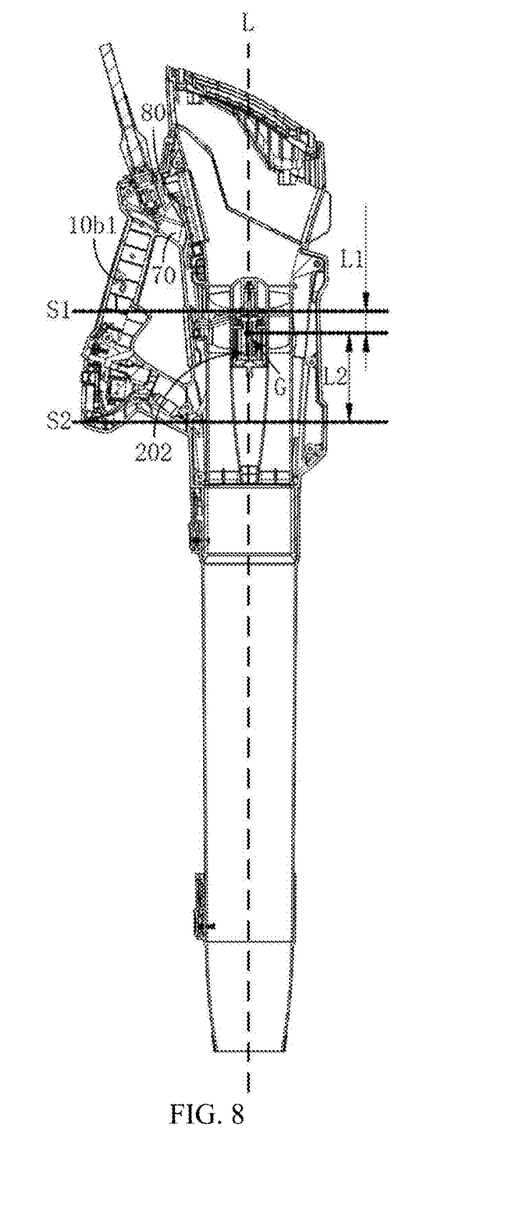
FIG. 8 is a schematic view showing anti-vibration plane relationship of the possible embodiment 2 of the present disclosure.

Further, referring to FIGS. 5 and 6, as well as FIGS. 7 and 8, a second anti-vibration component/second anti-vibration components 40 are provided between the end of the duct 201 away from the motor fan blade assembly 202 and the holding casing 10b. Similarly, the second anti-vibration component 40 makes the duct 201 and the holding casing 10b still separated by the anti-vibration component, and still maintains a state of non-direct contact. In this way, the second anti-vibration component 40 forms a second anti-vibration plane S2 parallel to the first anti-vibration plane S1, and the guide cone 203 is at least partially located between the first anti-vibration plane S1 and the second anti-vibration plane S2. Similarly, the second anti-vibration component 40 is preferably made of elastic material.

Those skilled in the art know that the guide cone 203 is connected to a motor seat for installing the motor. When the motor fan blade assembly 202 rotates, it will inevitably cause the guide cone 203 to vibrate. By setting the second anti-vibration plane S2, the vibration of the guide cone 203 can be suppressed. Specifically, the arrangement of the second anti-vibration plane S2 has multiple possible implementation methods.

[Possible Embodiment 1 of the Second Anti-Vibration Plane S2]

Figure 4:
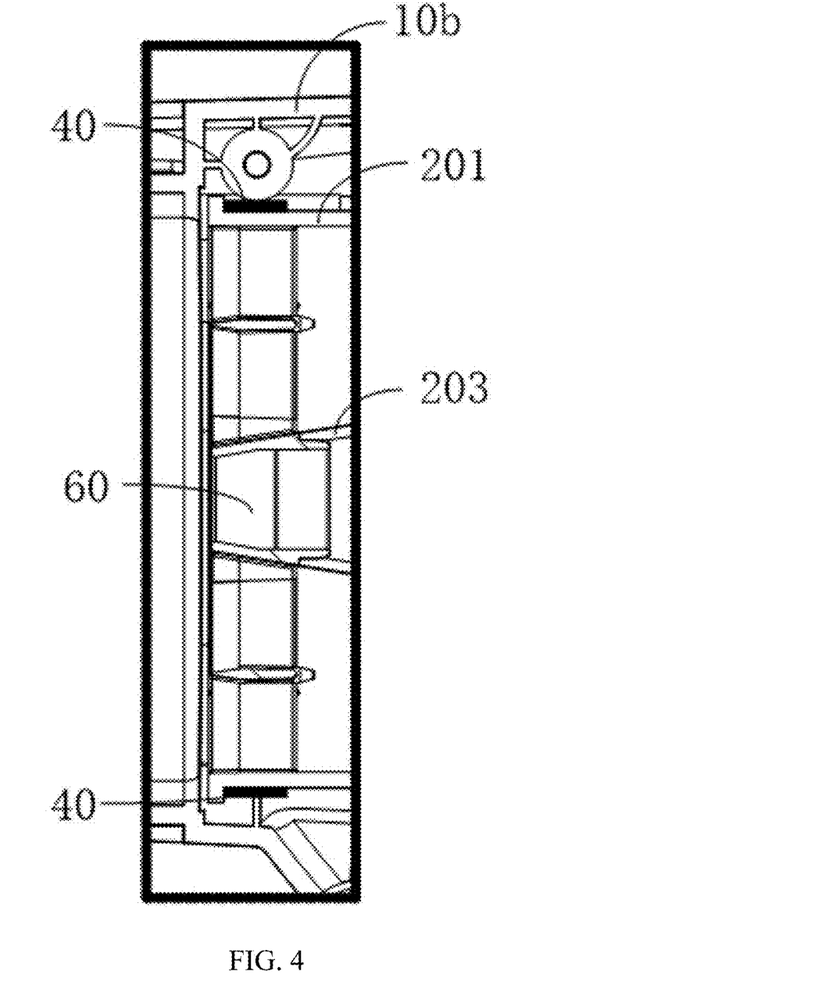
FIG. 4 is a partial enlarged schematic view of portion B of the present disclosure in FIG. 2.

In one possible embodiment, referring to FIGS. 2 and 4, and in combination with FIGS. 5 and 6, the outer duct 201 includes a support end 60 located at the air outlet, and the support end 60 is configured to support the cone end of the guide cone 203, and the other end of the guide cone 203 is connected to the motor seat. The second anti-vibration component 40 is sandwiched between the outer wall of the support end 60 and the inner wall of the holding casing 10b.

Herein, both ends of the guide cone 203 are positioned. On the one hand, the second anti-vibration plane S2 can effectively prevent vibration of the guide cone, and combined with the first anti-vibration plane S1, it can further effectively prevent vibration, on the other hand, the positioning of the two ends also has a counteracting effect on the disturbance generated by the high-speed airflow.

[Possible Embodiment 2 of the Second Anti-Vibration Plane S2]

In another embodiment, as shown in FIGS. 7 and 8, the second anti-vibration components 40 are close to the guide cone 203, and the second anti-vibration plane S2 formed by them passes through the guide cone 203 and is perpendicular to the axis extension direction of the guide cone 203.

[Possible Embodiment 3 of the Second Anti-Vibration Plane S2]

In another embodiment, multiple second anti-vibration planes can be allowed, for example, the second anti-vibration components 40 are sandwiched between the outer wall of the support end 60 and the inner wall of the holding casing 10b to form one second anti-vibration plane, and at the same time, other second anti-vibration components 40 are close to the guide cone 203, and another second anti-vibration plane formed by them passes through the guide cone 203. In this way, the effect of suppressing the vibration of the guide cone 203 will be better.

Further, the center of gravity G of the motor fan blade assembly 202 is located between the first anti-vibration plane S1 and the second anti-vibration plane S2. The center of the vibration source is located between the two anti-vibration planes, which can further suppress the vibration.

Further, the distance L2 from the second anti-vibration plane S2 to the center of gravity G is greater than the distance L1 from the first anti-vibration plane S1 to the center of gravity G. In this way, the center of the vibration source will be closer to the first anti-vibration plane S1, and the first anti-vibration plane S1 passes through the motor fan blade assembly 202 and/or the holding handle 10b1 located above the motor fan blade assembly 202. Thus, on the one hand, the first anti-vibration plane S1 is close to the center of the vibration source (motor fan blade assembly 202), which can largely offset the exciting force of the vibration generated by the motor fan blade assembly 202, and can more effectively suppress the vibration generated by the motor fan blade assembly 202, on the other hand, through the holding space below the holding handle 10b1, the vibration transmission from the holding casing 10b to the holding portion of the holding handle 10b1 is weakened.

Figure 9:
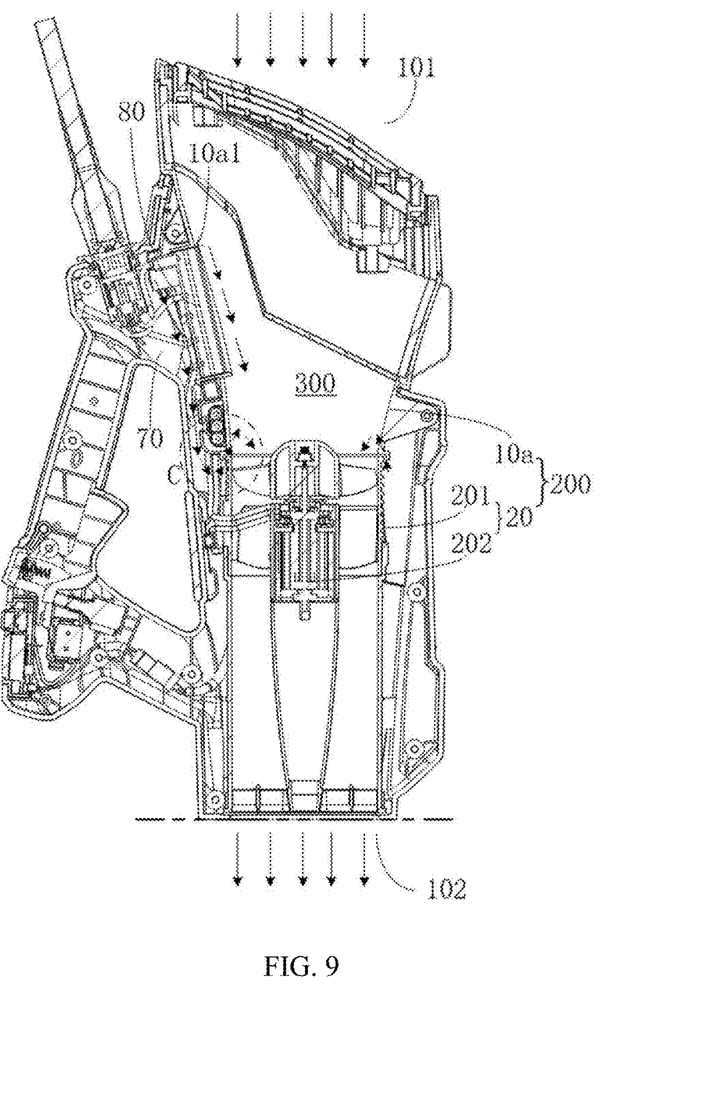
FIG. 9 is a schematic view of the heat dissipation structure of the controller in the second specific embodiment of the present disclosure.

Further, as shown in FIG. 9, under the rotation of the motor fan blade assembly 202, the airflow flows at high speed from the air inlet end 101 to the air outlet end 102, and a negative pressure inlet is formed at the annular interval between the outer duct 201 and the rear casing 10a. An accommodating chamber 70 connected to the negative pressure inlet is provided between the rear casing 10a and the holding casing 10b, and a controller 80 is provided in the accommodating chamber 70. The heat generated by the controller 80 during operation needs to be dissipated.

In the first embodiment, referring to the airflow arrows shown in FIG. 9, when the garden blower 100 is in operation, the heat generated by the controller 80 flows into the main air path through the negative pressure inlet from the accommodating chamber 70 and is taken away, which can play a role in cooling the controller 80.

Further, the rear casing 10a is provided with an installation port 10a1, the controller 80 is embedded in the installation port 10a1 for positioning, the heat dissipation fins of the controller 80 are exposed to the installation port 10a1, and the airflow flows at a high speed from the air inlet end 101 to the air outlet end 102, which is suitable for passing over the heat dissipation fins of the controller 80.

At this time, the high-speed airflow of the main air path passes over the surface of the heat dissipation fins exposed to the installation port 10a1, and further cools the controller 80.

Figure 11:
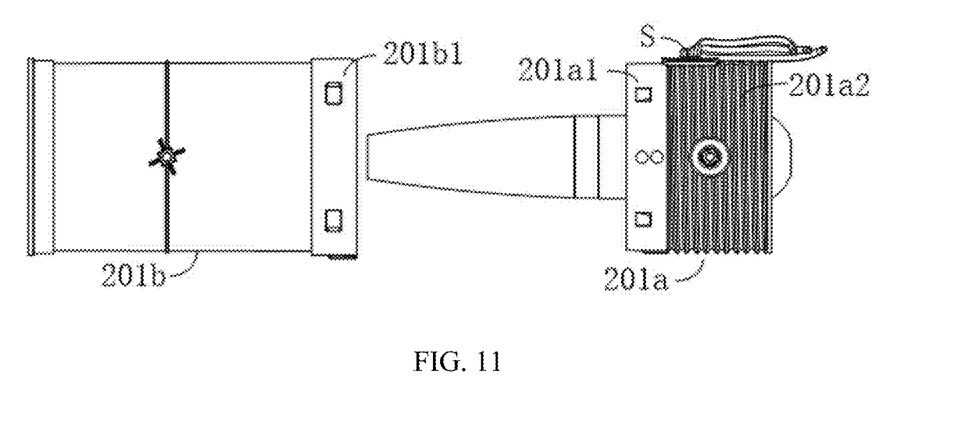
FIG. 11 is a schematic structural view of the outer duct of the present disclosure.

In addition, as shown in FIG. 11, the outer duct 201 includes a motor fan blade bracket 201a and a connecting pipe 201b connected to each other, the motor fan blade bracket 201a adopts a first connecting portion 201a1 to be connected to a corresponding second connecting portion 201b1 of the connecting pipe 201b, for example, a lock connection is adopted, the motor fan blade bracket 201a includes the above-mentioned motor seat, the motor fan blade bracket 201a is provided with a cable hole S for allowing the power line connecting the controller 80 with the motor to pass through, and the outer wall of the motor fan blade bracket 201a is formed with multiple reinforcing ring ribs, and the multiple reinforcing ring ribs cover the non-connected part 201a2 of the motor fan blade bracket 201a and the connecting pipe 201b.

In this way, it can avoid the overall structural strength of the motor fan blade bracket 201a from being reduced due to the cable hole S, and avoid the motor fan blade bracket 201a from deformation due to long-term accommodation of the motor fan blade assembly as a vibration source.

In short, when the garden blower 100 of the present disclosure is in operation, the vibration source mainly comes from the vibration generated by the rotation of the motor fan blade assembly 202 and the disturbance of the airflow to the housing 10 due to turbulence. By setting a plurality of first anti-vibration components 30 between the outer duct 201 and the holding casing 10b, the vibration generated by the rotation of the motor fan blade assembly 202 can be suppressed from being transmitted to other components, especially the holding casing 10b. At the same time, the annular interval between the outer duct 201 and the rear casing 10a can effectively avoid the mutual influence between the vibration of the motor fan blade assembly 202 and the disturbance of the rear casing 10a due to the airflow. The technical problem of the vibration of the blower in the prior art is effectively solved.

Second Embodiment

Figure 10:
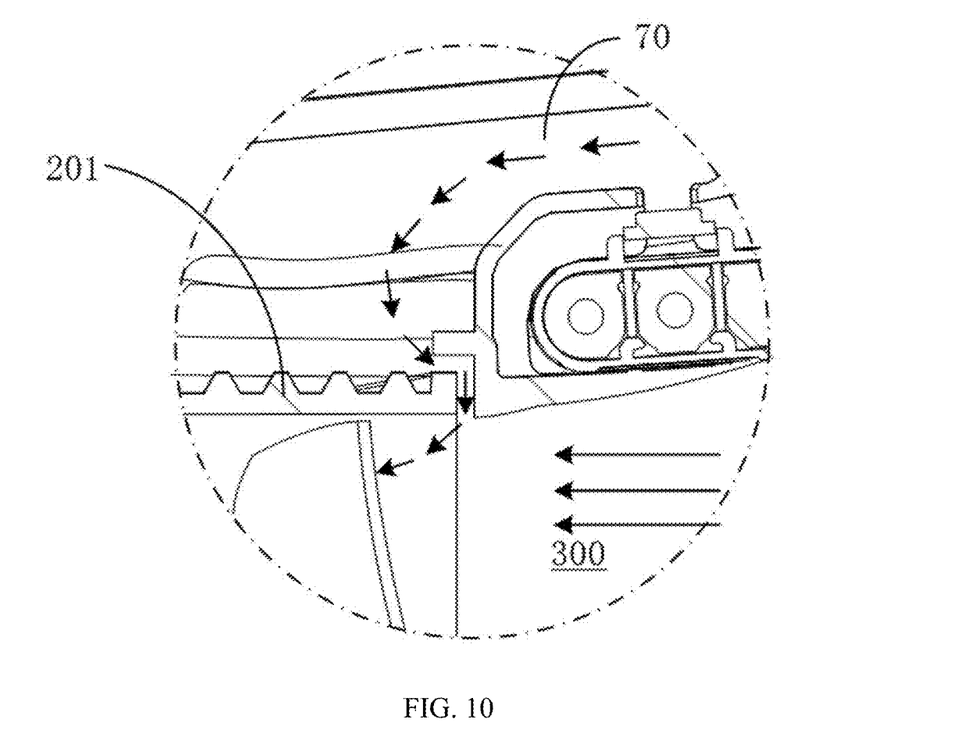
FIG. 10 is a partial enlarged schematic view of portion C of the present disclosure in FIG. 9.

Continuing to refer to FIGS. 9 and 10, in the Second Embodiment, the garden blower 100 includes a housing 10 having an air inlet end 101 and an air outlet end 102, and a main air path component 200.

The main air path component 200 includes a duct assembly 20, and forms a main air path 300 suitable for high-speed flow of air from the air inlet end to the air outlet end. An accommodating chamber 70 is formed between the main air path component 200 and the housing 10, and an electronic device is provided in the accommodating chamber 70. The electronic device generates heat during operation, and it is necessary to perform heat dissipation treatment.

The duct assembly 20 includes an outer duct 201 and a motor fan blade assembly 202 arranged in the outer duct 201.

The outer duct 201 of the duct assembly 20 is arranged in an annular interval with the rear casing 10a of the housing 10, so that a negative pressure inlet connected to the accommodating chamber 70 is formed between the outer duct 201 and the rear casing 10a. When the garden blower 100 is in operation, the airflow flows in from the air inlet end 101 and flows at a high speed toward the air outlet end 102, forming a negative pressure at the negative pressure inlet. The heat emitted by the electronic device in the accommodating chamber 70 flows from the accommodating chamber 70 into the main air path 300 through the negative pressure inlet. In this way, the heat generated by the electronic device when working will be immediately taken away by the high-speed airflow at the main air path 300, achieving the technical effect of immediate heat dissipation and cooling of the electronic device in the accommodating chamber 70. At the same time, the outer duct 201 and the rear casing 10a of the housing 10 are arranged in an annular interval. In order to ensure the existence of a stable negative pressure inlet, the outer duct 201 and the rear casing 10a maintain an absolute non-contact state. Whether the motor fan blade assembly 202 rotates and vibrates, or the rear casing 10a is disturbed by the airflow, the two will not touch each other. The two are independent of each other and are not affected by each other, and no vibration superposition will be generated.

In addition, a first anti-vibration component 30 is provided between the outer duct 201 of the duct assembly 20 and the holding casing 10b of the housing 10, so that the outer duct 201 and the holding casing 10b are spaced apart by the first anti-vibration component 30, and when the garden blower 100 is in operation, the outer duct 201 and the holding casing 10b are not in direct contact.

The first anti-vibration component 30 is close to the motor fan blade assembly 202, and forms a first anti-vibration plane S1 perpendicular to the motor axis L of the motor fan blade assembly 202, and the first anti-vibration plane S1 is parallel to the direction of the exciting force of the vibration generated by the motor fan blade assembly 202.

As described above, the first anti-vibration component 30 enables the outer duct 201 and the holding casing 10b to be spaced apart by the anti-vibration component, so as to maintain a state of non-direct contact, and the first anti-vibration component 30 is preferably made of elastic material, such as rubber. Thus, the outer duct 201 and the holding casing 10b are in indirect contact with each other through the anti-vibration component, and the elastic deformation of the first anti-vibration component 30 can suppress the vibration of the outer duct 201 caused by the rotation of the motor from being transmitted to the holding casing 10b.

In this way, the garden blower 100 can not only effectively prevent vibration, but also introduce the heat generated by the electronic device in the accommodating chamber into the main air path through the formed negative pressure inlet, and effectively dissipate the heat of the electronic device.

More preferably, the electronic device includes a controller 80, especially a brushless controller. In addition, still referring to FIG. 9, the rear casing 10a constitutes a part of the main air path component 200. That is, the main air path component 200 is at least partially composed of the duct assembly 20 and the rear casing 10a, and under the rotation of the motor fan blades, the main air path 300 is formed inside it. More preferably, the controller 80 is arranged between the rear casing 10a and the holding casing 10b.

Finally, it should be noted that the above embodiments are only used to illustrate the technical solutions of the present disclosure, rather than to limit it. Although the present disclosure has been described in detail with reference to the above embodiments, it should be understood by those skilled in the art that they can still modify the technical solutions described in the above embodiments, or replace some or all of the technical features therein, and these modifications or replacements do not make the essence of the corresponding technical solutions deviate from the scope of the technical solutions of the embodiments of the present disclosure.

What is claimed is:

1. A garden blower, comprising:
a housing having an air inlet end and an air outlet end; and
a duct assembly disposed in the housing and located between the air inlet end and the air outlet end,
wherein the duct assembly comprises an outer duct, a motor fan blade assembly and a guide cone, and the motor fan blade assembly and the guide cone are disposed in the outer duct;
wherein the outer duct and a rear casing of the housing are arranged in such a way that there is an annular interval therebetween, and the outer duct and the rear casing are deliberately set at a safe distance from each other so as to maintain an absolute non-contact state, forming a negative pressure inlet, thereby whether it is rotation vibration of the motor fan blade assembly or disturbance of the rear casing due to the airflow, the outer duct and the rear casing would not contact each other, and thereby no vibration superposition would be generated;
wherein a first anti-vibration component is provided between the outer duct and a holding casing of the housing, so that the outer duct and the holding casing are spaced apart by the first anti-vibration component to maintain a state of non-direct contact;
wherein the first anti-vibration component is close to the motor fan blade assembly and is situated on a first anti-vibration plane perpendicular to a motor axis of the motor fan blade assembly and parallel to a direction of an exciting force of the vibration generated by the motor fan blade assembly, and wherein the first anti-vibration plane passes through the motor fan blade assembly and/or a holding handle located above the motor fan blade assembly;
wherein a second anti-vibration component is provided between one end of the outer duct, away from the motor fan blade assembly and the holding casing, so that the outer duct and the holding casing are spaced apart by the second anti-vibration component to maintain a state of non-direct contact;
wherein the second anti-vibration component is situated on a second anti-vibration plane parallel to and non-coincident with the first anti-vibration plane, and wherein the guide cone is at least partially located between the first anti-vibration plane and the second anti-vibration plane;
wherein under the rotation of the motor fan blade assembly, air is capable of flowing at high speed from the air inlet end to the air outlet end, and wherein an accommodating chamber connected to the negative pressure inlet is provided between the rear casing and the holding casing, and a controller is provided in the accommodating chamber;
wherein the rear casing is provided with an installation port, and the controller is embedded in the installation port for positioning;
wherein the outer duct comprises a support end located at the air outlet, the support end is configured to support a cone end of the guide cone, the other end of the guide cone is connected to a motor seat, and the second anti-vibration component is sandwiched between an outer wall of the support end and an inner wall of the holding casing.

2. The garden blower according to claim 1, wherein the second anti-vibration component is arranged relative to the guide cone, such that the second anti-vibration plane passes through the guide cone and is perpendicular to an extension direction of an axis of the guide cone.

3. The garden blower according to claim 1, wherein a center of gravity of the motor fan blade assembly is located between the first anti-vibration plane and the second anti-vibration plane.

4. The garden blower according to claim 3, wherein a distance L2 from the second anti-vibration plane to the center of gravity is greater than a distance L1 from the first anti-vibration plane to the center of gravity.

5. The garden blower according to claim 1, wherein heat dissipation fins of the controller are exposed to the installation port, and the airflow flowing at high speed from the air inlet end to the air outlet end is suitable for passing over the heat dissipation fins of the controller.

6. The garden blower according to claim 1, wherein the outer duct comprises a motor fan blade bracket and a connecting pipe connected to each other, the motor fan blade bracket is provided with a cable hole for allowing a power line connecting the controller to a motor to pass through, and an outer wall of the motor fan blade bracket is formed with multiple reinforcing ring ribs, and the multiple reinforcing ring ribs cover a non-connected part of the motor fan blade bracket and the connecting pipe.

7. A garden blower, comprising:
a housing having an air inlet end and an air outlet end; and
a main air path component, comprising a duct assembly, and forming a main air path suitable for airflow to flow from the air inlet end to the air outlet end at high speed, an accommodating chamber being formed between the main air path component and the housing, and an electronic device being provided in the accommodating chamber, and the electronic device comprising a controller,
wherein the duct assembly comprises an outer duct and a motor fan blade assembly arranged in the outer duct;
wherein the outer duct and a rear casing of the housing are arranged in such a way that there is an annular interval therebetween, and the outer duct and the rear casing are deliberately set at a safe distance from each other so as to maintain an absolute non-contact state, forming a negative pressure inlet connected to the accommodating chamber between the outer duct and the rear casing, thereby whether it is rotation vibration of the motor fan blade assembly or disturbance of the rear casing due to the airflow, the outer duct and the rear casing would not contact each other, and thereby no vibration superposition would be generated;
wherein the rear casing is provided with an installation port, the controller is embedded in the installation port for positioning;
wherein during operation of the garden blower, the heat emitted by the electronic device flows from the accommodating chamber into the main air path through the negative pressure inlet;
wherein a first anti-vibration component is provided between the outer duct and a holding casing of the housing, so that the outer duct and the holding casing are spaced apart by the first anti-vibration component, and during operation of the garden blower, the outer duct and the holding casing are not in direct contact;
wherein the first anti-vibration component is close to the motor fan blade assembly and is situated on a first anti-vibration plane perpendicular to a motor axis of the motor fan blade assembly and parallel to a direction of an exciting force of the vibration generated by the motor fan blade assembly;
wherein a second anti-vibration component is provided between one end of the outer duct, away from the motor fan blade assembly and the holding casing, so that the outer duct and the holding casing are spaced apart by the second anti-vibration component to maintain a state of non-direct contact;
wherein the second anti-vibration component is situated on a second anti-vibration plane parallel to and non-coincident with the first anti-vibration plane, and wherein the guide cone is at least partially located between the first anti-vibration plane and the second anti-vibration plane;
wherein the outer duct comprises a support end located at the air outlet, the support end is configured to support a cone end of the guide cone, the other end of the guide cone is connected to a motor seat, and the second anti-vibration component is sandwiched between an outer wall of the support end and an inner wall of the holding casing.

8. The garden blower according to claim 7, wherein the rear casing forms an outer boundary of the main air path component, thereby creating constrained air paths within.

* * * * *